United States Patent
Ovat et al.

(10) Patent No.: US 12,331,169 B2
(45) Date of Patent: Jun. 17, 2025

(54) PREPARING A BLEND OF POLYSACCHARIDE AND INGREDIENT

(71) Applicant: Cargill, Incorporated, Wayzata, MN (US)

(72) Inventors: Nihan Ovat, Oss (NL); Rudy Roland Roux, Douai (FR); Dogan Sahin Sivasligil, Overijse (BE); Pieter Cornelis Jacobus Van Der Graaf, Heikant (NL)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 17/999,519

(22) PCT Filed: May 25, 2021

(86) PCT No.: PCT/US2021/033965
§ 371 (c)(1),
(2) Date: Nov. 21, 2022

(87) PCT Pub. No.: WO2021/242715
PCT Pub. Date: Dec. 2, 2021

(65) Prior Publication Data
US 2023/0135145 A1    May 4, 2023

(30) Foreign Application Priority Data

May 28, 2020 (EP) .................................. 20177087

(51) Int. Cl.
*C08J 3/00* (2006.01)
*B05D 1/02* (2006.01)
*C08J 3/07* (2006.01)

(52) U.S. Cl.
CPC .............. *C08J 3/005* (2013.01); *B05D 1/02* (2013.01); *C08J 3/07* (2013.01); *C08J 2303/02* (2013.01)

(58) Field of Classification Search
CPC .......... B05D 1/00; C08J 2302/02; C08J 3/005
See application file for complete search history.

(56) References Cited

U.S. PATENT DOCUMENTS

| | | | |
|---|---|---|---|
| 4,166,173 A | 8/1979 | Wurzburg | |
| 4,216,310 A | 8/1980 | Wurzburg | |
| 4,875,974 A * | 10/1989 | Rich | A61L 15/60 |
| | | | 162/99 |
| 4,938,840 A * | 7/1990 | Schachter | B01J 2/006 |
| | | | 134/119 |
| 5,032,337 A * | 7/1991 | Nachtergaele | D21H 17/28 |
| | | | 264/141 |
| 2003/0026888 A1* | 2/2003 | Guraya | A23J 1/12 |
| | | | 426/622 |
| 2004/0099613 A1 | 5/2004 | Franke | |
| 2005/0214541 A1 | 9/2005 | Berrada | |
| 2005/0239744 A1* | 10/2005 | Ioelovich | C08L 1/04 |
| | | | 536/56 |
| 2007/0240839 A1* | 10/2007 | Berckmans | C08B 30/18 |
| | | | 106/206.1 |
| 2008/0118765 A1* | 5/2008 | Dorgan | B82Y 30/00 |
| | | | 525/54.3 |

FOREIGN PATENT DOCUMENTS

| | | |
|---|---|---|
| CN | 1897986 A | 1/2007 |
| CN | 101624423 B | 5/2011 |
| CN | 110527113 A | 12/2019 |
| EP | 0137611 A2 | 4/1985 |
| EP | 3323490 B1 | 12/2020 |

OTHER PUBLICATIONS

Ruslim et al. (Chemical Engineering Research and Design, 87, 2009, 1075-1084) (Year: 2009).*
Lim et al. (Powder Technology 300 2016 146-156) (Year: 2016).*
Saez-Plaza, Purificacion et al., "An overview of the Kjeldahl method of nitrogen determination. Part II. Sample preparation, working scale, instrumental finish, and quality control", Critical Reviews in Analytical Chemistry, (20130000), vol. 43.4, pp. 224-272.
Bemiller et al., Starch; Chemistry and Technology, ISBN 978-0-12-746275-2.
Jane et al., Starch—Starke, (19860000), vol. 38, No. 8, pp. 258-263.
Kuakpetoon, Darisya-Jane Wang, "Characterization of different starches oxidized by hypochlorite", Starch—Starke, (20010000), vol. 53.5, pp. 211-218, XP001039217.
Saez-Plaza, Purificacion et al., "An overview of the Kjeldahl method of nitrogen determination. Part I. Early history, chemistry of the procedure, and titrimetric finish", Critical Reviews in Analytical Chemistry, (20130000), vol. 43.4, pp. 178-223.
Starch: chemistry and technology, Academic Press, (20090000), pp. 632-635.

* cited by examiner

*Primary Examiner* — Liam J Heincer

(57) ABSTRACT

The invention is directed to a method of preparing a blend comprising a polysaccharide and a water soluble or dispersible ingredient. More in particular, the invention relates to the preparation of such blend using a filter centrifuge. The method of the invention comprises a. feeding a polysaccharide slurry to a filter centrifuge via a first inlet; b. rotating the filter centrifuge at a first centrifuge speed to provide a polysaccharide cake; c. feeding a sprayable ingredient to the filter centrifuge via a second inlet; and d. spraying the sprayable ingredient onto the polysaccharide cake while rotating the filter centrifuge at a second centrifuge speed to produce a blend of the polysaccharide and the ingredient.

16 Claims, 5 Drawing Sheets

PREPARING A BLEND OF POLYSACCHARIDE AND INGREDIENT

CROSS REFERENCE TO RELATED APPLICATIONS

This application is a national phase application of PCT Application No. PCT/US2021/033965, filed May 25, 2021, which claims the benefit of European Application No. 20177087.2 filed May 28, 2020, each of which is incorporated by reference herein in its entirety.

The invention is directed to a method of preparing a blend comprising a polysaccharide and a water soluble or dispersible ingredient. More in particular, the invention relates to the preparation of such blend using a filter centrifuge.

Polysaccharides have a wide range of applications in food, pharmaceutical, industrial applications.

Processes for the recovery and purification of polysaccharides (such as starch, cellulose, alginate, carrageenan, xanthan, pectin, gellan, welan, pullulan, curdlan, rhamsan, and sphingan polymers) from an aqueous fluid in which they are dissolved or dispersed, typically rely on a water-miscible non-solvent precipitation of the polysaccharide, such as an alcohol precipitation, among others. The aqueous fluid can comprise polysaccharides that are the products of microbial fermentation or extraction from a plant material. In certain cases, the addition of various substances, e.g. salt(s), or adjustment of pH can have beneficial effects, for instance reducing the amount of non-solvent required for precipitation of the polysaccharide. Typically, following precipitation, the polysaccharide is dried.

Dewatering and washing of starch is, for example, disclosed in US-A-2004/0 099 613. In this document, the starch is washed and dewatered using a vacuum filter.

For a number of reasons, during a certain process it may be desirable to blend the polysaccharide with another ingredient. Typically, such blending is performed separately, using a dedicated blending device. Since many polysaccharides are viscous even at low concentrations, the handling and processing (e.g. blending) of these materials is often difficult. Blending it with other ingredients is therefore often a power intensive process.

There remains a need in the art to improve and simplify polysaccharide processing, and in particular a process involving blending of a polysaccharide with an ingredient. At the same time it is desirable to minimise loss of the blended ingredient during the process of dewatering. An objective of the invention is therefore to provide an economic and/or efficient process for preparing a blend comprising a polysaccharide and an ingredient.

The inventors surprisingly found that this objective can, at least in part, be met by integrating a blending step in an existing polysaccharide dewatering step.

The invention therefore provides a method of preparing a blend comprising a polysaccharide and an ingredient, the method comprising
  a) feeding a polysaccharide slurry to a filter centrifuge via a first inlet;
  b) rotating the filter centrifuge at a first centrifuge speed to provide a polysaccharide cake;
  c) feeding a sprayable ingredient to the filter centrifuge via a second inlet; and
  d) spraying the sprayable ingredient onto the polysaccharide cake while rotating the filter centrifuge at a second centrifuge speed to produce a blend of the polysaccharide and the ingredient.

The inventors surprisingly found that this method allows a reduction in equipment, because dewatering and blending may be integrated in a single step, hence using less equipment. Consequently, a manufacturing plant may be designed more compact. As a result, not only an economic benefit may be achieved, but also the footprint of the total plant may be reduced. In certain instances, a reduction in capital expenditure may be achieved.

Moreover, the inventors surprisingly found that the method of the invention results in optimal blending, thereby outperforming conventional blending using separate blending devices, such as paddle mixers, high speed mixers (e.g. manufactured by Loedige®) whether continuous or batch. The method of the invention further outperforms inline introduction of a dry ingredient in a dry finished polysaccharide product.

The term "polysaccharide slurry" as used herein is meant to refer to a dispersion or a suspension of the polysaccharide in a solvent (hereinafter referred to as the "slurry solvent"), e.g. water or an organic solvent such as alcohol. The choice of the slurry solvent depends on the solubility of the polysaccharide in said solvent, low solubilities being preferred as explained more in detail hereinbelow. The slurry is preferably a homogeneous slurry, or at least it is homogenised before, preferably immediately before, being fed to the filter centrifuge.

As already mentioned, the slurry solvent is preferably chosen with regard to the polysaccharide to ensure a low solubility of said polysaccharide in said solvent. The slurry solvent is most suitably chosen from the group consisting of organic solvents and/or water. Organic solvents include aromatic compounds, e.g. benzene and toluene; alcohols; esters and ethers; ketones, e.g. acetone; amines; and nitrated and halogenated hydrocarbons. Preferably, the organic solvent is an alcohol chosen from the group consisting of monohydric alcohols, polyhydric alcohols, unsaturated alcohols, alicyclic alcohols and mixtures thereof. Most preferred organic solvents are alcohols chosen from the group consisting of ethanol, methanol, propanol, isopropanol, isopropyl alcohol, butanol, glycerol, ethylene or polypropylene glycol, cetyl alcohol and mixtures thereof. Preferably, the slurry solvent is chose from the group consisting of water, ethanol, methanol, propanol, isopropanol, isopropyl alcohol, butanol, glycerol, ethylene or polypropylene glycol, cetyl alcohol and mixtures thereof.

A suitable polysaccharide for the invention is a polysaccharide which can be processed into a slurry, i.e. a slurry can be produced by dispersing the polysaccharide in the slurry solvent. Preferably, the polysaccharide is not soluble in the slurry solvent, at the conditions under which the centrifuge is operating, e.g. it has a solubility of less than 5 g/100 ml solvent at 20° C., such as less than 2 g/100 ml solvent, or less than 1 g/100 ml solvent. Solubility of polysaccharide, as used herein, is determined by the method of Jane et al. (*Starch-Stärke* 1986, 38 (8), 258-263).

As used herein, the term "polysaccharide" is meant to include hydrocolloids, cellulose, cellulose derivatives, starch, starch derivatives, maltodextrin, dextrin, manno-oligosaccharides, xylo-oligosaccharides, polydextrose, glycogen, citrus fibres, cocoa fibres, glucans, and mixtures thereof. Preferably, the polysaccharide is a maltodextrin, a dextrin, a starch or starch derivative. Most preferably, the polysaccharide is a starch or starch derivative.

The skilled person knows what slurry solvent to use in order to ensure for the low solubility of the polysaccharide in said solvent. For example for cellulose, cellulose derivatives, starch, starch derivatives, citrus fibres, cocoa fibres, glycogen and mixtures thereof, the most preferred solvent is water; and for glucans, hydrocolloids, maltodextrin, dextrin, manno-oligosaccharides, xylo-oligosaccharides and polydextrose, an organic solvent is most preferably used.

Preferably, the polysaccharide slurry utilises water as slurry solvent and a polysaccharide having a cold water solubility (at 20° C.) of less than 5 g/100 ml water, such as less than 2 g/100 ml water, or less than 1 g/100 ml water, wherein the polysaccharide is chosen from the group consisting of cellulose, cellulose derivatives, starch, starch derivatives, citrus fibres, cocoa fibres, glycogen and mixtures thereof. Most preferred polysaccharide slurry contains water and a starch or a starch derivative, said starch or starch derivative having a cold water solubility (at 20° C.) of less than 5 g/100 ml water, such as less than 2 g/100 ml water, or less than 1 g/100 ml water.

The term "hydrocolloids" as used herein is meant to include alginate, pectin, xanthan gum, guar gum, locust bean gum, carrageenan, derivatives and mixtures of two or more. In case of a hydrocolloid is used as the polysaccharide in accordance with the invention, the slurry solvent is preferably an organic solvent, most preferred an alcohol.

Alginates are produced by seaweeds and are linear unbranched polymers containing β-(1-4)-D-mannuronic acid and α-(1-4)-L-guluronic acid residues. Alginates consist of blocks of similar and strictly alternating residues.

Pectin is a heterogenous grouping of acidic structural polysaccharides found in fruit and vegetables and mainly prepared from waste citrus peel and apple pomace. Pectin has a complex structure, and a large part of the structure consists of homopolymeric partially methylated poly-α-(1-4)-D-galacturonic acid residues with substantial hairy non-gelling areas of alternating α-(1-2)-L-rhamnosyl-α-(1-4)-D-galacturonosyl sections containing branch points with mostly neutral side chains (1-20 residues) of mainly L-arabinose and D-galactose. The properties of pectins depend on the degree of esterification, which is normally about 70%. The low-methoxy pectins are <40% esterified, while high-methoxy pectins are >43% esterified, usually about 67%. Amidated pectin is also a suitable candidate.

Xanthan gum is a microbial desiccation resistant polymer prepared commercially by aerobic submerged fermentation. It is naturally produced to stick bacteria to the leaves of cabbage-like plants. Xanthan gum is an anionic polyelectrolyte with a β-(1-4)-D-glucopyranose glucan backbone with is de chains of (3-1)-α-D-mannopyranose(2-1)-β-D-glucuronic acid-(4-1)-β-D-mannopyranose on alternating residues. Slightly less than half of the terminal mannose residues are 4,6-pyruvated and the inner mannose is mostly 6-acetylated. Each molecule consists of about 7000 pentamers and the gum is less polydisperse than most hydrocolloids.

Guar gum is a galactomannan consisting of a (1-4)-β-D-mannopyranose backbone with branch-points from their 6-positions linked to α-D-galactose. There are between 1.5 to 2 mannose residues for every galactose residue. Guar gum is made up of non-ionic polydisperse rod-shaped polymers consisting of molecules made up of about 10 000 residues. Guar gum is highly water-soluble and, e.g., more soluble than locust bean gum.

Locust bean gum is a galactomannan similar to guar gum. It is polydisperse and consists of non-ionic molecules made up of about 2000 residues. Locust bean gum is less soluble and has lower viscosity than guar gum as it has fewer galactose branch points. It needs heating to dissolve but is soluble in hot water.

Carrageenan is a collective term for polysaccharides prepared by alkaline extraction from red seaweed. The basic structure of carrageenan consists of alternating 3-β-D-galactopyranose and 4-α-D-galactopyranose units. The regular backbone structure of the basic structure of carrageenan is disrupted by a more or less ordered distribution of sulphate ester groups. Carrageenan can also contain same methoxy and pyruvate groups. Carrageenans are linear polymers of about 25 000 galactose derivatives.

Cellulose is an aggregate of linear polymers of D-glucopyranosyl residues in the chain form, which are linked together entirely in the β-1,4 configuration. Cellulose and cellulose derivatives include microcrystalline cellulose, microfribillated cellulose, cellulose ethers such as carboxymethyl cellulose hydroxypropylmethyl cellulose, methyl cellulose, ethyl methyl cellulose, hydroxypropyl cellulose and the like.

β-glucan may occur in the bran of grains such as barley, oats, rye and wheat or they may be produced by fermentation, e.g. scleroglucan, schizophyllan, and the like. β-glucans, typically consist of linear unbranched polysaccharides of linked β-(1-3)-D-glucopuranose units in a random order.

Polydextrose is a food ingredient classified as soluble dietary fibre and is frequently used to increase the non-dietary fibre content of food, to replace sugar, reduce calories and reduce fat content. It is a multipurpose food ingredient synthesised from dextrose, potentially plus about 10% sorbitol and 1% citric acid.

Starch typically contains a mixture of two molecular entities, namely amylose and amylopectin in various amounts. Amylose is the starch polysaccharide that primarily consists of long chained α-1,4-D-glucose molecules with an average degree of polymerisation between about 500-5000. Amylopectin consists of relatively short chain α-1,4-D-glucose molecules interconnected by many α-1,6-branch points (approximately 1/25). The molecular weight of amylopectin molecules is in the range of several millions. The amylopectin:amylose ratio can vary between 100:0 and 10:90 depending on the plant source.

The starches can be derived from any native source, wherein native relates to the fact that said starch is found in nature. Unless specifically distinguished, references to starch in this description are meant to include their corresponding flours, which are still containing proteins, such as wheat gluten (hereinafter "starch"). Typical sources for the starches are cereals, tubers, roots, legumes, fruit starches and hybrid starches. Suitable sources include but are not limited to corn, pea, potato, sweet potato, sorghum, banana, barley, wheat, rice, sago, amaranth, tapioca, arrowroot, canna, and low amylose (containing no more than about 10% by total weight of amylose, preferably no more than 5%) or high amylose (containing at least about 40% by total weight of amylose) and varieties thereof. Also suitable are starches derived from a plant obtained by breeding techniques including crossbreeding, translocation, inversion, transformation or any other method of gene or chromosome engineering to include variations thereof. In addition, starch derived from a plant grown from artificial mutations and variations of the above generic composition, which may be produced by, known standard methods of mutation breeding are also suitable herein. Modifications are intended to include chemical modifications and physical modifications. The chemical modifications are intended to include without limitation crosslinked starches, acetylated starches, hydroxyethylated and hydroxypropylated starches, inorganically esterified starches, cationic, anionic, oxidised starches, zwitterionic starches, starches modified by enzymes, and combinations thereof, provided that the starches are not fully dissolved in the liquid medium and provide a slurry of suspended particles. It is to be understood that mixtures of any of the above mentioned starches and/or flours may also be used. For the sake of simplicity, any reference herein to starch, starch derivative or starch substrate will be understood to include one or several kinds of native starch, and/or starch derivatives.

In accordance with the method of the invention the polysaccharide slurry is fed to the centrifuge via the first inlet. The polysaccharide slurry may have a dry solids content of at least 10 wt %, more preferably at least 20 wt %, more preferably at least 30 wt %, more preferably at least 50 wt %. The polysaccharide slurry may have a slurry solvent content of 40-90% by total weight of the slurry, such as 50-80%, or 55-75%. Preferably, when the slurry solvent is water, the polysaccharide is chosen from the group consisting of cellulose, cellulose derivatives, starch, starch derivatives, citrus fibres, cocoa fibres, glycogen and mixtures thereof and the water content is preferably between 40-90% by total weight of the slurry, such as 50-80%, or 55-75%.

The method of the invention is performed in a centrifuge. Preferably, the centrifuge is a batch centrifuge, i.e. a centrifuge that operates on batches. Most preferably the centrifuge is a filter centrifuge, or peeler centrifuge, operating in batch mode. Such filter centrifuges are well-known to the person skilled in the art and are typically employed for drying or water washing of polysaccharides such as starch, to remove contaminants contained therein. Water washing typically involves passing a volume water over and through a polysaccharide cake in order to wash out eventual contaminants present in the polysaccharide cake. A suitable filter centrifuge is, for instance, disclosed in EP-A-3 323 490.

In accordance with the invention, the centrifuge is rotated at a first centrifuge speed to provide a polysaccharide cake. If a filter centrifuge is used, while rotating, the polysaccharide slurry is pressed against a centrifuge filter (typically a cloth) to at least partly remove solvent and form a polysaccharide cake on the centrifuge filter.

This first centrifuge speed is preferably at least 100 rpm, more preferably at least 200 rpm, most preferably at least 300 rpm. Preferably, the first centrifuge speed may be 300-1500 rpm, preferably 400-1200 rpm, such as 500-1000 rpm. The first centrifuge speed may be maintained for a centrifuging time of 0.1-10 min, preferably 0.5-5 min, such as 1-3 min.

Preferably, the slurry amount and concentration, centrifuge speed and the centrifuging time are adjusted to obtain a polysaccharide cake having a thickness of 1-30 cm, such as 2-28 cm, or 3-25 cm.

Optionally, upon having formed a polysaccharide cake, the filter centrifuge may be rotated for an additional period in order to further remove solvent from the polysaccharide cake. This may suitably be done at the first centrifuge speed or at a centrifuge speed (hereinafter referred to as the dewatering centrifuge speed) that is higher than the first centrifuge speed. Provided that the centrifuge speed for removing solvent is higher than the first centrifuge speed, suitable centrifuge speeds for removing solvent may be 400-2500 rpm, preferably 500-2000 rpm, such as 600-1500 rpm. In general, the centrifuge speed depends on the size of the centrifuge (inner diameter) and the type of polysaccharide. The person skilled in the art can adjust this to a level needed to have the required solvent level. This optional further solvent removal step may be performed for a period of 1-30 min, such as 2-20 min, 3-15 min, or 5-12 min and is carried out before step d) of the process of the invention.

In step c) (which may optionally be combined with the optional further solvent removal step mentioned above), the sprayable ingredient is fed to the filter centrifuge via a second inlet. Preferably, the second inlet is not the same as the first inlet. The sprayable ingredient may be a liquid ingredient, e.g. a molten ingredient or a solution of said ingredient or ingredients which are in the liquid state at the operating temperature.

The sprayable ingredient is preferably a sprayable mixture of the ingredient in a suitable solvent, said solvent being referred to herein as the "ingredient-solvent". The sprayable mixture can be a solution, dispersion, or suspension of said ingredient in said ingredient-solvent. The concentration of the ingredient in the sprayable mixture depends on the type of ingredient and the purpose for which the ingredient is used, e.g. as reagent, as bulking agent, as dispersant, etc. Said concentration can vary within wide ranges, e.g. from 1 ppm to 500 g/l, most used concentrations being in the range of 0.1-400 g/l, such as 0.5-250 g/l, 1-100 g/l, 2-75 g/l, 5-50 g/l, or 10-40 g/l. The concentration of the sprayable mixture may be adapted to provide adequate diffusion and distribution of the ingredient. The ingredient-solvent is preferably water, but if needed, organic solvents as exemplified above in relation to the slurry-solvent may be also used, as well as combinations thereof. The most preferred organic solvent to be used as ingredient-solvent is an alcohol, suitable examples thereof being provided hereinabove. It is contemplated that the remaining slurry-solvent in the polysaccharide cake after the first centrifugation step can thus be calculated to minimise ingredient losses in the filtrate after spraying.

The sprayable ingredient is sprayed over the polysaccharide cake while rotating the filter centrifuge at a second centrifuge speed to produce a blend of the polysaccharide and the ingredient. This may be done using a feed distributor, a nozzle and/or a spray bar. Preferably, the sprayable mixture is sprayed over the polysaccharide cake using a spray bar. The spray bar may suitably be integrated in the filter centrifuge. For a homogeneous distribution of the spray droplets over the polysaccharide cake, it is preferred that the central axis of the spray bar is along the rotational axis of the filter centrifuge.

The term "sprayable" as used herein is meant to refer to ingredients that can be applied by a standard spraying device, such as a spray bar. A sprayable ingredient is capable of being formed into droplets and/or being misted. Sprayable ingredients may have a viscosity of from 100-2000 mPa·s in particular from 100-1000 mPa·s at 20° C. An ingredient may be rendered sprayable, e.g., by melting, solubilising, dispersing, emulsifying, and/or the like.

The ingredient to be blended with the polysaccharide may be any type of ingredient, which is sprayable, most preferably as a solution, dispersion and/or suspension in the ingredient-solvent. Preferably, the ingredient is a water soluble ingredient and the sprayable ingredient is a solution of said ingredient in water. Preferably, the ingredient undergoes a chemical and/or a physical interaction with the polysaccharide. Such chemical and/or physical interaction may include covalent bonding, ionic bonding, electrostatic interactions, hydrogen bonding, hydrophobic-hydrophobic interaction, hydrophilic-hydrophilic interaction, chemisorption, and physisorption. The water serves as the transport medium for the ingredient.

Some suitable examples of water soluble ingredients include salts, such as sodium carbonate, potassium carbonate, ammonium carbonate, sodium persulphate, potassium persulphate, ammonium persulphate, calcium carbonate, sodium sulphate, potassium sulphate, ammonium sulphate, sodium citrate, potassium citrate, ammonium citrate, lime, etc.; additives, such as biocides; pH buffers; pH adjusting chemicals, such as sodium hydroxide, potassium hydroxide, ammonium hydroxide, sodium carbonate, potassium carbonate, ammonium carbonate, sodium bicarbonate, potassium bicarbonate, ammonium bicarbonate, hydrogen chloride, sulphuric acid; processing aids; antifoaming agents; flowing agents; and bleaching or oxidizing agents.

Some suitable examples of reagent ingredients include sodium trimetaphosphate (STMP), phosphorylchloride (POCl$_3$), sodium hypochlorite (NaClO), hydrogen peroxide, adipic acid, acetic anhydride, p-octenyl succinic anhydride, 3-chloro-2-hydroxypropyl trimethylammonium chloride (CHPT), propylene oxide, epichlorohydrine, catalysts, metal ions, etc. Furthermore, reagent ingredients that modify polysaccharide (such as starch) by esterification, etherification, oxidation, amidation and the like may be used. Such reagents are, for instance, disclosed in "Modified Starches: Properties and uses", Ed. O. B. Wurzburg, CRC Press, Boca Raton, Florida, 1986 and "Starch: Chemistry and Technology", Eds. R. L. Whistler, J. N. BeMiller, and E. F. Paschall, Academic Press, 2$^{nd}$ Ed., 1984.

Figure 1:
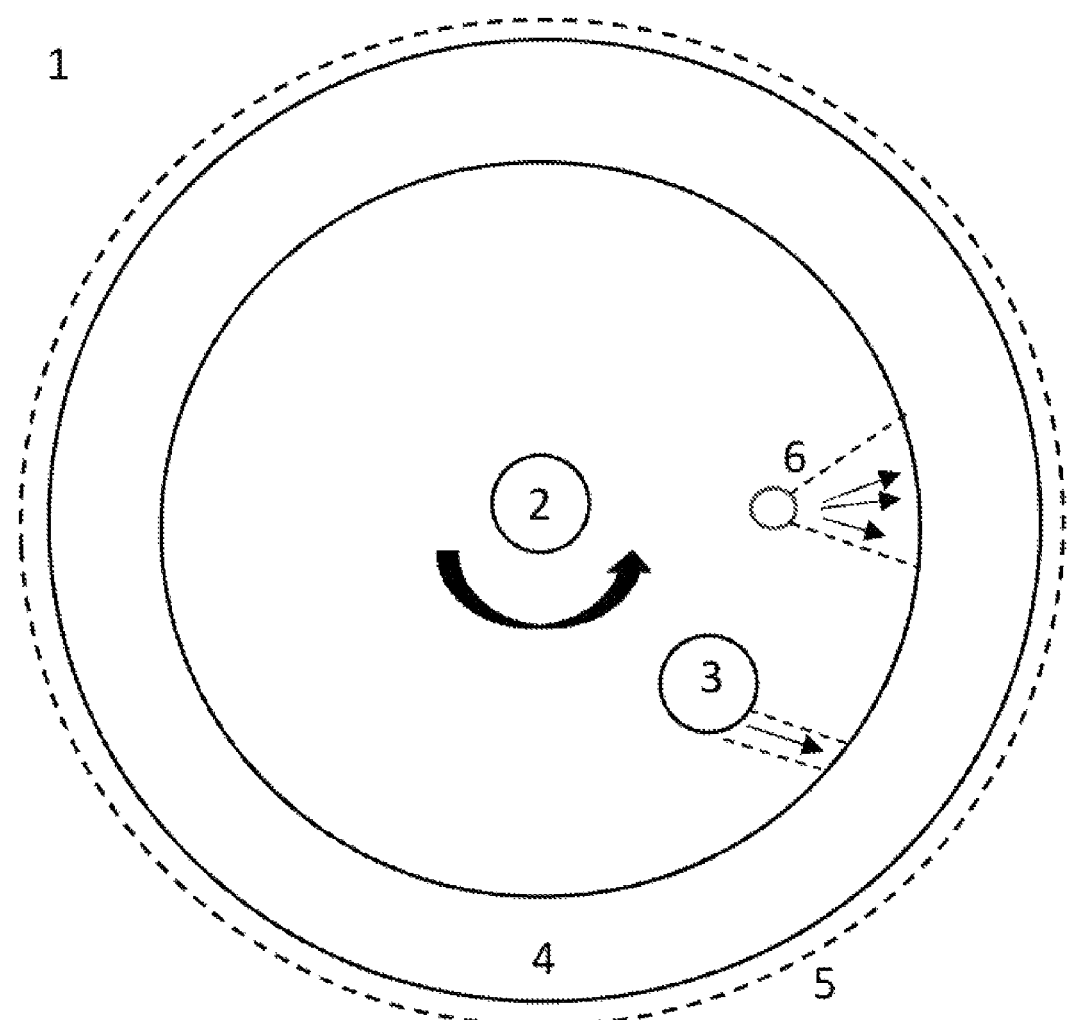
FIG. 1 illustrates an exemplary schematic of a centrifuge for employing the method of the invention.

A schematic exemplary illustration of employing the method of the invention in a centrifuge is shown in FIG. 1. In this figure, basket centrifuge (1) is rotating by means of central shaft (2). Feed pipe (3) is used to feed suspension into centrifuge (1), thereby forming polysaccharide cake (4), which is kept in place on filter plate (5). Subsequently, ingredient is sprayed onto the polysaccharide cake via spraying bar (6).

When starting spraying of the sprayable ingredient, the polysaccharide cake preferably has a slurry solvent content of 20-60% by total weight of the polysaccharide cake, such as 25-50%, or 30-45%. The inventors surprisingly found that good mixing of the polysaccharide with the ingredient is achieved when the polysaccharide cake has a relatively low slurry solvent content of 20-60% by total weight of the polysaccharide cake, such as 25-50%, or 30-45%.

The second centrifuge speed may be the same as the first centrifuge speed, but preferably the second centrifuge speed is lower than the first centrifuge speed. The second centrifuge speed is preferably at least 10 rpm, more preferably at least 30 rpm, most preferably at least 50 rpm. The second centrifuge speed may, for instance, be 50-1000 rpm, 200-500 rpm, or 250-400 rpm.

Spraying the sprayable ingredient may take 1-60 min, such as 2-50 min, 3-35 min, or 4-20 min, or 5-15 min. For example, a sprayable solution, dispersion and/or suspension of the ingredient in the ingredient-solvent having a concentration of 0.1-50 g/l, such as 0.5-25 g/l, or 1-10 g/l, can be sprayed over the polysaccharide cake over a period of 20-60 min, such as 25-45 min.

The total amount of sprayable ingredient sprayed over the polysaccharide cake depends on what needs to be achieved and/or the concentration of the ingredient. Most typical amounts are at least 0.01 l/Kg of polysaccharide cake, preferably at least 0.05 l/Kg of polysaccharide cake, more preferably at least 0.1 l/Kg of polysaccharide cake. Said amount can be as high as at most 10 l/Kg of polysaccharide cake, preferably at most 5 l/Kg of polysaccharide cake, more preferably at most 1 l/Kg of polysaccharide cake. Typical amounts may be 0.1-0.6 l per kg of polysaccharide cake, such as 0.1-0.5 l, or 0.15-0.4 l. Higher levels may results in losses of the ingredient. Depending on the ingredient used, spraying may, for example, be done at a rate of 10-1000 ml/min/kg polysaccharide, such as 100-500 ml/min/kg polysaccharide.

Optionally, after having sprayed the sprayable ingredient over the polysaccharide cake in step d), the filter centrifuge may be rotated for an additional period in order to dry the blend of polysaccharide and ingredient. This may suitably be done at a centrifuge speed that is the same or higher than the second centrifuge speed. For example, the centrifuge speed for drying the blend may be 500-2500 rpm, preferably 800-2000 rpm, such as 1000-1600 rpm. This optional drying step may be performed for a period sufficient to achieve a moisture content in said cake of at most 30 wt %, more preferably at most 20 wt %, most preferably at most 15 wt %. Typical periods include those of 1-30 min, such as 2-20 min, 3-15 min, or 5-12 min. Further lowering of the solvent content of the blend may also, or in addition, be accomplished by blowing hot air through the blend.

Depending on the type of polysaccharide and ingredient, the content of the ingredient in the resulting blend may vary. For example, in case of a starch cake having a moisture content of about 40%, the maximum amount of ingredient will be around 100-400 g/l/kg sprayed. Lower limits could lie around 10-500 ppm based on dry weight of the blend.

The blend of polysaccharide and ingredient can then be collected from the filter centrifuge and optionally subjected to further treatment and/or processing.

The inventors found that the method of the invention yields a blend wherein the ingredient is optimally distributed within the polysaccharide, as shown below in the examples.

The inventors also found that the method of the invention can be utilized to carry out various polysaccharide modifications or chemical reactions involving polysaccharides. Examples of such reactions are well known for example from BeMiller et al. "*Starch; Chemistry and Technology*" ISBN: 978-0-12-746275-2, included herein by reference. In particular the method of the invention proved suitable to carry out polysaccharide cationization, polysaccharide cross-linking, polysaccharide acid-thinning and polysaccharide oxidation.

The invention therefore relates to a process for a cationization of a polysaccharide, said polysaccharide being preferably a starch, comprising:
(a) Providing a polysaccharide slurry, preferably having a dry solids concentration of between 10 and 50 wt %, more preferably between 20 and 45 wt %, most preferably between 30 and 40 wt %, said slurry preferably having a pH of between 9.0 and 12.0, more preferably between 10.0 and 11.8, most preferably between 11.0 and 11.6 and containing a basic catalyst, said catalyst being preferably chosen from NaOH or Ca(OH)$_2$;
(b) providing an aqueous cationizing additive, said additive comprising a cationizing reagent, said reagent preferably comprising 3-chloro-2-hydroxypropyl trimethylammonium chloride (CHPT) or 2,3-epoxypropyltrimethylammonium chloride (EPTC), the reagent being in an amount of preferably between 1.0 and 50 wt % relative to the dry starch weight, more preferably between 2.0 and 30 wt %, most preferably between 3.0 and 10 wt %, wherein when the reagent is CHPT, said additive comprises NaOH or $Ca(OH)_2$ in an amount of between 0.20 and 10 wt %, more preferably between 0.6 and 2.0 wt %;
(c) feeding the polysaccharide slurry to a filter centrifuge via a first inlet;
(d) rotating the filter centrifuge at a first centrifuge speed to provide a polysaccharide cake;
(e) feeding the aqueous cationizing additive to the filter centrifuge via a second inlet; and
(f) spraying said additive onto the polysaccharide cake while rotating the filter centrifuge at a second centrifuge speed, said additive being sprayed in an amount of preferably between 20 and 50 wt % relative to the mass of dry solids in the cake, more preferably between 25 and 40 wt %, most preferably between 30 and 35 wt %;
(g) preferably drying and/or grinding the product obtained in step (f);
(h) optionally curing before, during or after step (g), preferably at a temperature of between room temperature (about 20° C.) and 80° C., the product of step (f) or step (g).

The invention also relates to an acid-thinning process of a polysaccharide, said polysaccharide being preferably a starch, comprising:
(a) Providing a polysaccharide slurry, preferably having a dry solids content of at least 10 wt %;
(b) Providing an aqueous acid-thinning additive, said additive comprising an acid;
(c) feeding the polysaccharide slurry to a filter centrifuge via a first inlet;
(d) rotating the filter centrifuge at a first centrifuge speed to provide a polysaccharide cake;
(e) feeding the aqueous acid-thinning additive to the filter centrifuge via a second inlet in a sufficient amount to achieve a pH of the polysaccharide cake to at most 7, more preferably at most 5, most preferably between 1 and 4; and
(f) spraying said additive onto the polysaccharide cake while rotating the filter centrifuge at a second centrifuge speed, said additive being sprayed in an amount of preferably between 20 and 50 wt % relative to the mass of dry solids in the cake, more preferably between 25 and 40 wt %, most preferably between 30 and 35 wt %;
(g) preferably drying and/or grinding the product obtained in step (f);
(h) optionally curing before, during or after step (g), preferably at a temperature of between room temperature (about 20° C.) and 80° C., the product of step (f) or step (g).

The invention also relates to a cross-linking process of a polysaccharide, said polysaccharide being preferably a starch, comprising:
(a) Providing a polysaccharide slurry, preferably having a dry solids content of at least 10 wt %, said slurry preferably having a pH of between 9.0 and 12.0, more preferably between 10.0 and 11.8, most preferably between 11.0 and 11.6;
(b) Providing an aqueous cross-linking additive, said additive comprising a cross-linking reagent, said reagent preferably comprising sodium trimetaphosphate (STMP), the reagent being in an amount of preferably between 0.1 and 1000 ppm relative to the dry starch weight, more preferably between 1 and 500 ppm, most preferably between 10 and 350 ppm;
(c) feeding the polysaccharide slurry to a filter centrifuge via a first inlet;
(d) rotating the filter centrifuge at a first centrifuge speed to provide a polysaccharide cake;
(e) feeding the aqueous cross-linking additive to the filter centrifuge via a second inlet; and
(f) spraying said additive onto the polysaccharide cake while rotating the filter centrifuge at a second centrifuge speed, said additive being sprayed in an amount of preferably between 20 and 50 wt % relative to the mass of dry solids in the cake, more preferably between 25 and 40 wt %, most preferably between 30 and 35 wt %;
(g) preferably drying and/or grinding the product obtained in step (f);
(h) optionally curing before, during or after step (g), preferably at a temperature of between room temperature (about 20° C.) and 80° C., the product of step (f) or step (g).

The invention also relates to an oxidation process of a polysaccharide, said polysaccharide being preferably a starch, comprising:
(a) Providing a polysaccharide slurry, preferably having a dry solids content of at least 10 wt %;
(b) Providing an aqueous oxidation additive, said additive comprising active chlorine in an amount of preferably between 0.1 and 10.0 wt % relative to the dry polysaccharide weight, more preferably between 0.1 and 5.0 wt % and most preferably between 0.1 and 2.5 wt %.
(c) feeding the polysaccharide slurry to a filter centrifuge via a first inlet;
(d) rotating the filter centrifuge at a first centrifuge speed to provide a polysaccharide cake;
(e) feeding the aqueous oxidation additive to the filter centrifuge via a second inlet; and
(f) spraying said additive onto the polysaccharide cake while rotating the filter centrifuge at a second centrifuge speed, said additive being sprayed in an amount of preferably between 20 and 50 wt % relative to the mass of dry solids in the cake, more preferably between 25 and 40 wt %, most preferably between 30 and 35 wt %;
(g) preferably drying and/or grinding the product obtained in step (f);
(h) optionally curing before, during or after step (g), preferably at a temperature of between room temperature (about 20° C.) and 80° C., the product of step (f) or step (g).

The pH of slurries or polysaccharide cakes described above can be measured according to known methods in the art, e.g. a pH-meter or a pH paper. For a cake, forming a slurry from the cake (e.g. about 20 wt % dry solids) before the pH measurement helps with achieving more precise values.

The invention has been described by reference to various embodiments, and methods. The skilled person understands that features of various embodiments and methods can be combined with each other.

All references cited herein are hereby completely incorporated by reference to the same extent as if each reference were individually and specifically indicated to be incorporated by reference and were set forth in its entirety herein.

Hereinafter, the invention will be illustrated in more detail, according to specific examples. However, the invention may be embodied in many different forms and should not be construed as being limited to the embodiments set forth herein. Rather, these example embodiments are provided so that this description will be thorough and complete, and will fully convey the scope of the invention to those skilled in the art.

EXAMPLES

Comparative Example 1—Addition of Salt in Last Fraction of Slurry

A starch slurry (38% dry solids) was prepared by mixing 11.5 kg of starch with 15.5 kg of water. Sodium chloride salt was mixed into the slurry in a conventional mixer in an amount of 10% based on total slurry weight (2 kg). The slurry was fed to a filter centrifuge, which was rotated at a centrifuge speed of 700 rpm, at a rate of 350 l/h. After all slurry was fed to the centrifuge, the centrifuge speed was increased to 1400 rpm and the filter cake was centrifuged for 10 min. The resulting blend had a moisture content of 35-42% based on total weight.

Comparative Example 2—Addition of Salt in Last Fraction of Slurry

A starch slurry (38% dry solids) was prepared by mixing 11.5 kg of starch with 15.5 kg of water. Sodium chloride salt was mixed into the slurry in a conventional mixer in an amount of 10% based on total slurry weight (1 kg). The slurry was fed to a filter centrifuge, which was rotated at a centrifuge speed of 700 rpm, at a rate of 350 l/h. After all slurry was fed to the centrifuge, the centrifuge speed was increased to 1400 rpm and the filter cake was centrifuged for 10 min. The resulting blend had a moisture content of 35-42% based on total weight.

Comparative Example 3—Addition of Salt in Last Fraction of Slurry

A starch slurry (38% dry solids) was prepared by mixing 11.5 kg of starch with 15.5 kg of water. Sodium chloride salt was mixed into the slurry in a conventional mixer in an amount of 10% based on total slurry weight (1 kg). The slurry was fed to a filter centrifuge, which was rotated at a centrifuge speed of 700 rpm, at a rate of 750 l/h. After all slurry was fed to the centrifuge, the centrifuge speed was increased to 1400 rpm and the filter cake was centrifuged for 10 min. The resulting blend had a moisture content of 35-42% based on total weight.

Inventive Example 1—Spray Salt Solution on Partially Dewatered Cake

A starch slurry (38% dry solids) was prepared by mixing 11.5 kg of starch with 15.5 kg of water. The starch slurry was fed to a filter centrifuge, which was rotated at a centrifuge speed of 700 rpm, at a rate of 350 l/h. After all slurry was fed to the centrifuge, the centrifuge speed was increased to 1400 rpm. Then, a salt solution (5 l of 5% sodium chloride) was sprayed over the filter cake over a period of about 30 min. Subsequently, the filter cake was centrifuged at 1400 rpm for another 5 min. The resulting blend had a moisture content of 35-42% based on total weight.

Inventive Example 2—Spray Salt Solution on Dewatered Cake

A starch slurry (38% dry solids) was prepared by mixing 11.5 kg of starch with 15.5 kg of water. The starch slurry was fed to a filter centrifuge, which was rotated at a centrifuge speed of 700 rpm, at a rate of 750 l/h. After all slurry was fed to the centrifuge, the centrifuge speed was increased to 1400 rpm. The filter cake was then dewatered by centrifuging at 1400 rpm for a period of 10 min. Then, a salt solution (5 l of 5% sodium chloride) was sprayed over the filter cake over a period of about 30 min. Subsequently, the filter cake was centrifuged at 1400 rpm for another 5 min. The resulting blend had a moisture content of 35-42% based on total weight.

Results

An overview of the Examples and the mass balance for each example is shown in Tables 1 and 2 below.

TABLE 1

| | Speed slurry feeding (l/h) | Salt addition by spraying | Salt addition by spraying | Salt addition in slurry phase | Salt introduced (g) |
|---|---|---|---|---|---|
| CE1 | 350 | | | 10% of 2 kg slurry | 200 |
| CE2 | 350 | | | 10% of 1 kg slurry | 100 |
| CE3 | 750 | | | 10% of 1 kg slurry | 100 |
| IE1 | 350 | | 5 l of 5% salt solution | | 250 |
| IE2 | 750 | 5 l of 5% salt solution | | | 250 |

TABLE 2

Mass balance

| | Starch for slurry (kg) | Water for slurry (kg) | Salt solution sprayed (l) | Cake weight (kg) | Cake moisture (%) | Water left in cake (kg) | Filtrate weight (kg) |
|---|---|---|---|---|---|---|---|
| CE1 | 11.5 | 15.5 | | 15.85 | | 6.3 | 10.7 |
| CE2 | 11.5 | 15.5 | | 15.8 | | 5.2 | 11.8 |
| CE3 | 11.5 | 15.5 | | 15.6 | 42 | 6.7 | 10.3 |
| IE1 | 11.5 | 15.5 | 5 | 16 | 37 | 6.2 | 15.8 |
| IE2 | 11.5 | 15.5 | 5 | 15.3 | 40 | 6.7 | 15.3 |

Figure 2:
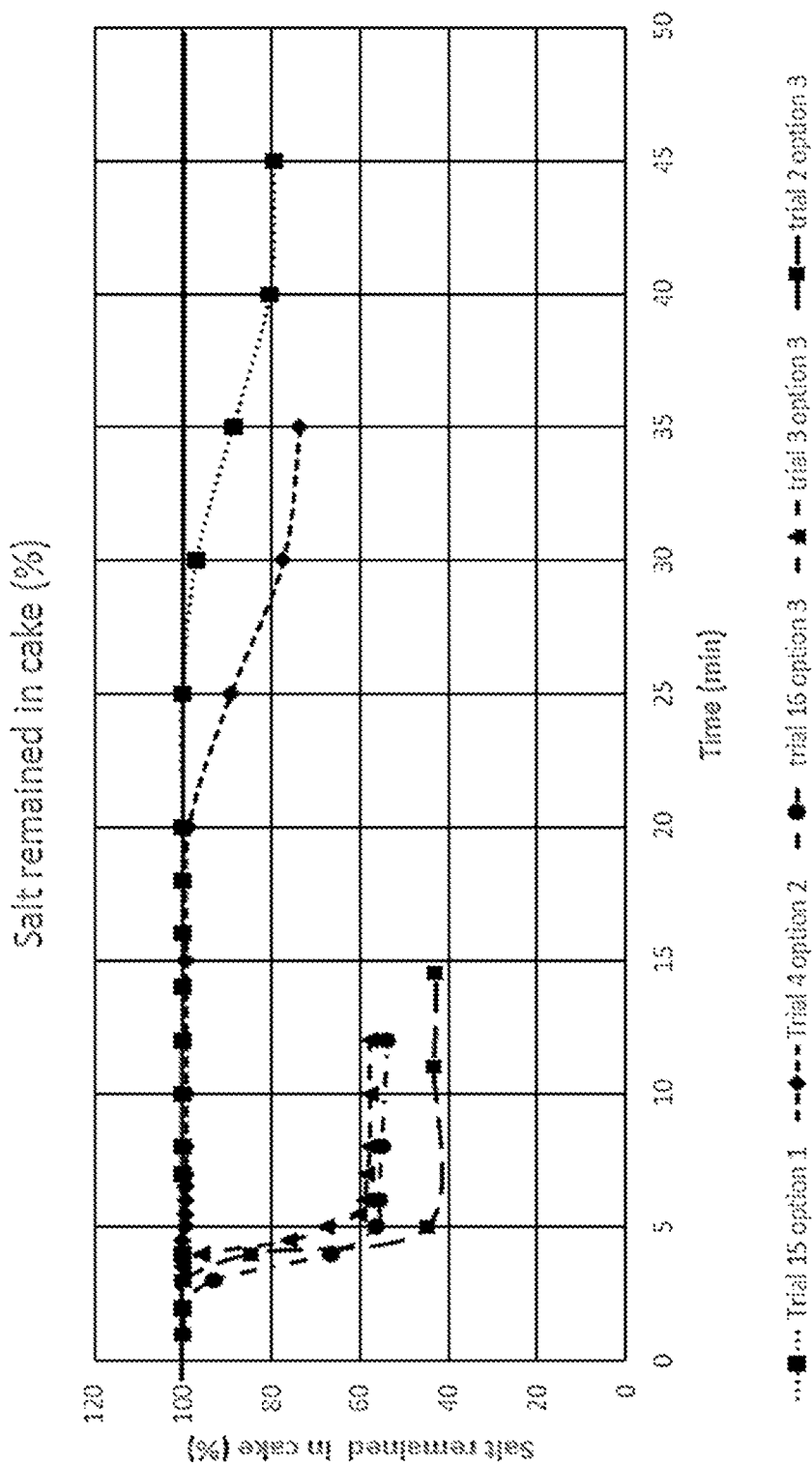
FIG. 2 illustrates a graph of the percent salt remaining in the cake as a function of time.

FIG. 2 shows the percentage of salt that is contained in the cake compared to what was introduced. In this figure Trial 15 option 1 corresponds to IE2, Trial 4 option 2 corresponds to IE1, Trial 16 option 3 corresponds to CE3, Trial 3 option 3 corresponds to CE2, and Trial 2 option 3 corresponds to CE1.

Homogeneity of the salt dispersion throughout the starch filter cake was measured by conductivity of the cake. Conductivity was measured at three different positions along the y-axis of the centrifuge as well as at the inner and outer surface of the cake. The results are shown in Tables 3, 4 and 5.

TABLE 3

Cake conductivity for CE3

| Position in centrifuge (y-axis) | Cake thickness (cm) (x-axis) | Conductivity of cake x = 0 (μS/cm) | Conductivity of cake x = 4 cm (μS/cm) | Moisture cake (%) |
|---|---|---|---|---|
| Top | 4 | 1686 | 73 | 42 |
| Middle | 4 | 988 | 70 | 42 |
| Bottom | 4 | 2120 | 75 | 42 |

TABLE 4

Cake conductivity for IE1

| Position in centrifuge (y-axis) | Cake thickness (cm) (x-axis) | Conductivity of cake x = 0 (μS/cm) | Moisture cake (%) |
|---|---|---|---|
| Top | 4.5 | 3620 | 34 |
| Bottom | 3.5 | 6530 | 40 |

TABLE 5

Cake conductivity for IE2

| Position in centrifuge (y-axis) | Cake thickness (cm) (x-axis) | Conductivity of cake x = 0 (μS/cm) | Conductivity of cake x = 4 cm (μS/cm) | Moisture cake (%) |
|---|---|---|---|---|
| Top | 4 | 511 | 103 | 40 |
| Middle | 4 | 1302 | 1279 | 40 |
| Bottom | 4 | 1109 | 704 | 40 |

These results show that the feeding flow of the slurry has an impact on the thickness and on the moisture of the filter cake. With a higher feeding flow (750 l/h) the cake has a better homogeneity in moisture and thickness.

Additionally, the starch filter cake has a better salt distribution with the salt addition by spraying according to the invention. Salt is present throughout the filter cake.

Inventive Example 3—Performing a Cationic Modification of a Native Wheat Starch

A starch slurry at 38% of dry solids was prepared by mixing 1100 g of native wheat starch with 1400 g of water, 55 g of sodium chloride (5% wNaCl/wstarch) was added to it. The pH of the slurry was adjusted to 11.6 with a 4% sodium hydroxide solution, the mixing occurred at 21° C. and under high level of stirring to ensure quick dispersion and avoid gelatinization of the starch.

The slurry was then fed to a filter centrifuge (model CEPA LS L3386), it was operating at 2100 rpm and dewatering took less than one minute. Immediately after the dewatering, 320 g of the spraying solution was prepared by mixing 68 g of a 60% 3-chloro-2-hydroxypropyl trimethylammonium chloride (CHPT) solution with 85 g of a 10% sodium hydroxide solution and 167 g of water. CHPT is transformed in the presence of NaOH into GMAC (glycidyl trimethyl-ammonium chloride). The resulting solution is sprayed in the filter centrifuge on the filter cake with a spray bar using a pump (480-500 mL/min) within 1 minute, the centrifuge is then turned off. Finally, a piece of the wet cake (37-43% moisture) was sliced vertically, crumbled, mixed and dried (14% moisture), it was then stored in a closed vessel and placed in an oven set at 45° C. for 18 hours.

To determine the degree of substitution of cationic modified starch, the standard Kjeldahl method to study nitrogen content was performed, details of the technique and underlying methods are thoroughly explained in Sáez-Plaza, Purificación, et al. "*An overview of the Kjeldahl method of nitrogen determination. Part I. Early history, chemistry of the procedure, and titrimetric finish.*" Critical Reviews in Analytical Chemistry 43.4 (2013): 178-223 and in Sáez-Plaza, Purificación, et al. "*An overview of the Kjeldahl method of nitrogen determination. Part II. Sample preparation, working scale, instrumental finish, and quality control.*" Critical Reviews in Analytical Chemistry 43.4 (2013): 224-272.

In order to calculate the cationic degree of substitution in starch and therefore the yield, it was necessary to slightly adapt the procedure: remove all the unreacted chemicals by washing 30 g of the dry starch for 30 minutes with 1.5 L of a 70:30 ethanol and water solution. The washed sample was prepared for analysis following the Kjeldahl procedure for starch, known in prior art and in the referenced article. The analysis showed, after correcting for nitrogen content for the base material, a cationic degree of substitution of 0.012 mol cationic unit/mol anhydroglucose unit (reaction efficiency: 62%).

Moreover, literature reports comparable results in terms of efficiency for the same levels of substitution. BeMiller, J. N., & Whistler, R. L. (Eds.). (2009). "*Starch: chemistry and technology*". Academic Press. Third Edition. Pages 632-635 mentions that wet processes, aiming at 0.02-0.05 degree of substitution, can achieve up to 70-85% reaction efficiencies for the same CHPT modification.

Inventive Example 5—Performing an Acid-thinning of a Native Corn Starch

A starch slurry at 41% of dry solids was prepared by mixing 1165 g of native corn starch with 1335 g of water. The 2.5 kg of slurry was kept under constant mixing to ensure an effective dispersion of the solids. Additionally, a 320 g of a diluted acid solution was prepared by mixing 91 g of a 3M solution of hydrochloric acid with 229 g of water.

The starch slurry was fed to a filter centrifuge (model CEPA LS L3386) operating at 2100 rpm and dewatering took less than one minute. Immediately after the dewatering the diluted acid solution was sprayed in the filter centrifuge on the filter cake with a spray bar using a pump (480-500 mL/min) within 1 minute. Finally, pieces of the wet cake (37-43% moisture) were sliced vertically, crumbled, mixed, stored in a closed vessel, placed in an oven at different temperatures (50° C. and 65° C.) and left to react for 6 and 18 hours. Final product moisture was between 11%-14%.

To assess the extent of thinning of the samples, the common approach is to measure the viscosity of the starch slurry, the viscometer Brabender Viscograph-E has been used for such analysis. Each sample was neutralized with sodium hydroxide until a pH of 6-7 and left to dry once again. Final product moisture was between 11%-14%. The dry products were slurrified (40 g of dry starch and 440 g of water), placed in the viscometer and viscosity profiles at different temperatures have been obtained. Table 6 and FIG. 3 display these results.

TABLE 6

Reaction conditions for different thinned starch samples.

| SAMPLE | HCl CONTENT ($g_{HCl}/kg_{starch}$) | REACTION TEMPERATURE (° C.) | REACTION TIME (hours) |
|---|---|---|---|
| Unmodified native corn starch (CONTROL) | — | — | — |
| Example 5A | 4.5 | 50 | 6 |
| Example 5B | 4.5 | 65 | 6 |
| Example 5C | 4.5 | 50 | 18 |

Inventive Example 6—Performing Cross-linking on a Native Corn Starch

A starch slurry at 38% of dry solids was prepared by mixing 1100 g of native corn starch with 1400 g of water. 55 g of sodium chloride (5% wNaCl/wstarch) was also added to into the slurry. The pH of the slurry was adjusted to 11.5 with a 4% sodium hydroxide solution, the mixing occurred at 21° C. and under high level of stirring to ensure quick dispersion and avoid gelatinization of the starch. Additionally, 320 g of dilute spraying solutions were prepared by mixing different amounts (0.18 g-0.34 g) of sodium trimetaphosphate (STMP-cross linker) and topping up the rest of the weight with demineralized water.

The starch slurry was fed to a filter centrifuge (model CEPA LS L3386) operating at 2100 rpm and dewatering took less than one minute. Immediately after the dewatering the dilute STMP solution was sprayed in the filter centrifuge on the filter cake with a spray bar using a pump (480-500 mL/min) within 1 minute. Finally, pieces of the wet cake (37-43% moisture) were sliced vertically, crumbled, mixed, stored in a closed vessel, placed in an oven at 45° C. and left to react for 4 hours. Post to modification, the semi dry cake was slurrified, neutralized with hydrochloric acid until pH 6-7 and left to dry overnight. Final product moisture was between 11%-14%.

To assess the extent of crosslinking of the samples, the common approach is to measure the viscosity of the starch slurry, the viscometer Brabender Viscograph-E has been used for such analysis. The dry products were slurrified (40 g of dry starch and 440 g of water), placed in the viscometer and viscosity profiles at different temperatures have been obtained. Table 7 and FIG. 4 display these results.

| SAMPLE | STMP CONTENT (ppm) | REACTION TEMPERATURE (° C.) | REACTION TIME (hours) |
|---|---|---|---|
| Unmodified native corn starch (CONTROL) | — | — | — |
| Example 6A | 135 | 45 | 4 |
| Example 6B | 250 | 45 | 4 |

Figure 4:
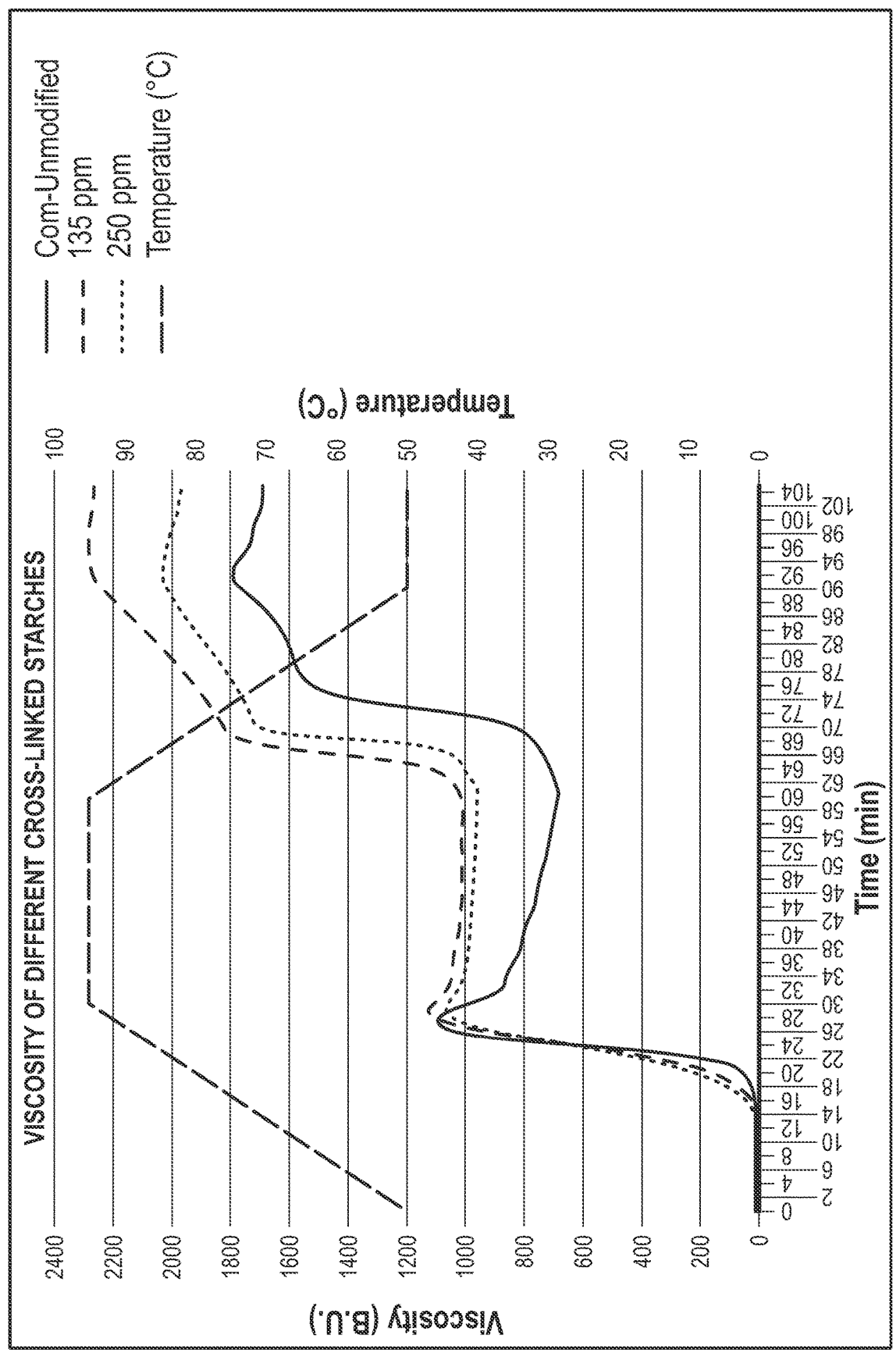
FIG. 4 illustrates the viscosity profiles of starch slurries as described in Inventive Example 6.

As can be observed in FIG. 4, the processes of Examples 6A and 6B successfully managed to create a link between molecular chains, as demonstrated by the shift in the hold viscosity and overall shape of the curve.

Inventive Example 7—Performing Oxidation on a Native Corn Starch

A starch slurry at 41% of dry solids was prepared by mixing 1165 g of native corn starch with 1335 g of water. The 2.5 kg of slurry was kept under constant mixing to ensure an effective dispersion of the solids. Additionally, 320 g of spray solutions were prepared by mixing different amounts (30.8 g-61.6 g) of a sodium hypochlorite solution (163 g of active chlorine per kilogram of NaOCl solution) and topping up the leftover volume with demineralized water.

The starch slurry was fed to a filter centrifuge (model CEPA LS L3386) operating at 2100 rpm and dewatering took less than one minute. Immediately after the dewatering the NaOCl solution was sprayed in the filter centrifuge on the filter cake with a spray bar using a pump (480-500 mL/min) within 1 minute. Finally, pieces of the wet cake (37-43% moisture) were sliced vertically, crumbled, mixed and left to react and dry overnight at room temperature. Final product moisture was between 11%-14%.

Figure 3:
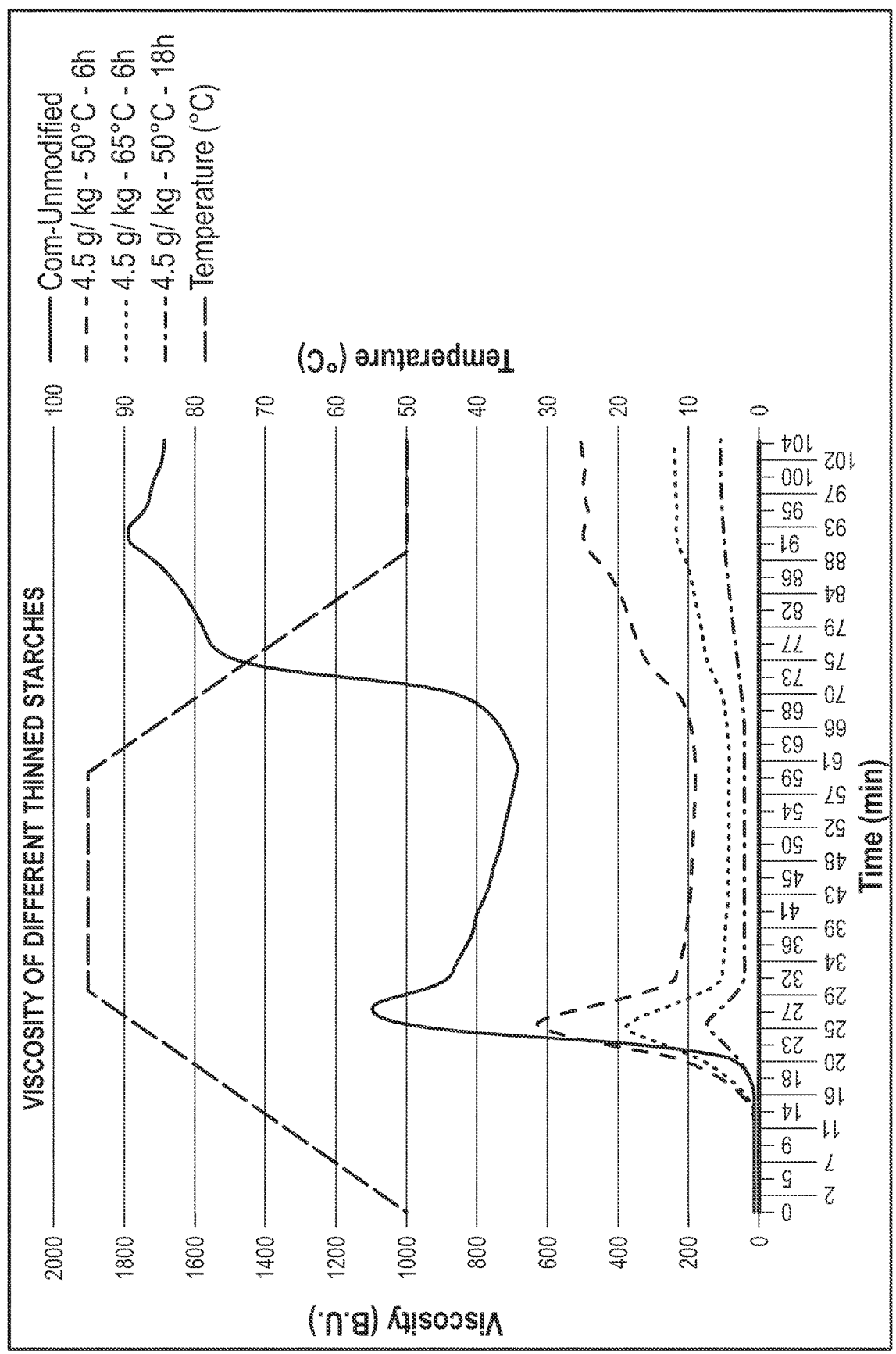
FIG. 3 illustrates the viscosity profiles of starch slurries as described in Inventive Example 5.

To assess the extent of oxidation in the samples, the common approach is to measure the viscosity of the starch slurry, the viscometer Brabender Viscograph-E has been used for such analysis. The dry products were slurrified (40 g of dry starch and 440 g of water), placed in the viscometer and viscosity profiles at different temperatures have been obtained. FIG. 3 displays these results.

Furthermore, the content of carboxyl groups has been measured using the procedure described by Kuakpetoon et al. [4]: 2 g of starch was mixed with 25 mL of 0.1N HCl solution and stirred for 30 minutes, the slurry was filtered through a paper filter and washed with 500 mL of demineralized water. The filtered wet cake was transferred to a beaker, 300 mL of demineralized water was added to it and the slurry was heated until complete gelatinization of the starch (95° C.). Afterwards, 150 mL of demineralized water was added to the slurry and the solution was titrated with 0.01N NaOH until pH 8.3, the whole procedure was repeated for a blank test with unmodified corn starch. The following equations were used to calculate the percentage of carboxyl groups:

$$m_{eq}/[100\ g]_{starch} = ([(V_{Sample} - V_{Blank}) \times N_{NaOH} \times 100])/(Sample.Weight)$$

$$\%\ COOH = m_{eq}/[100g]_{starch} \times 0.045$$

With $V_{Sample}$ and $V_{Blank}$ expressed in milliliters and sample weight in grams.

Figure 5:
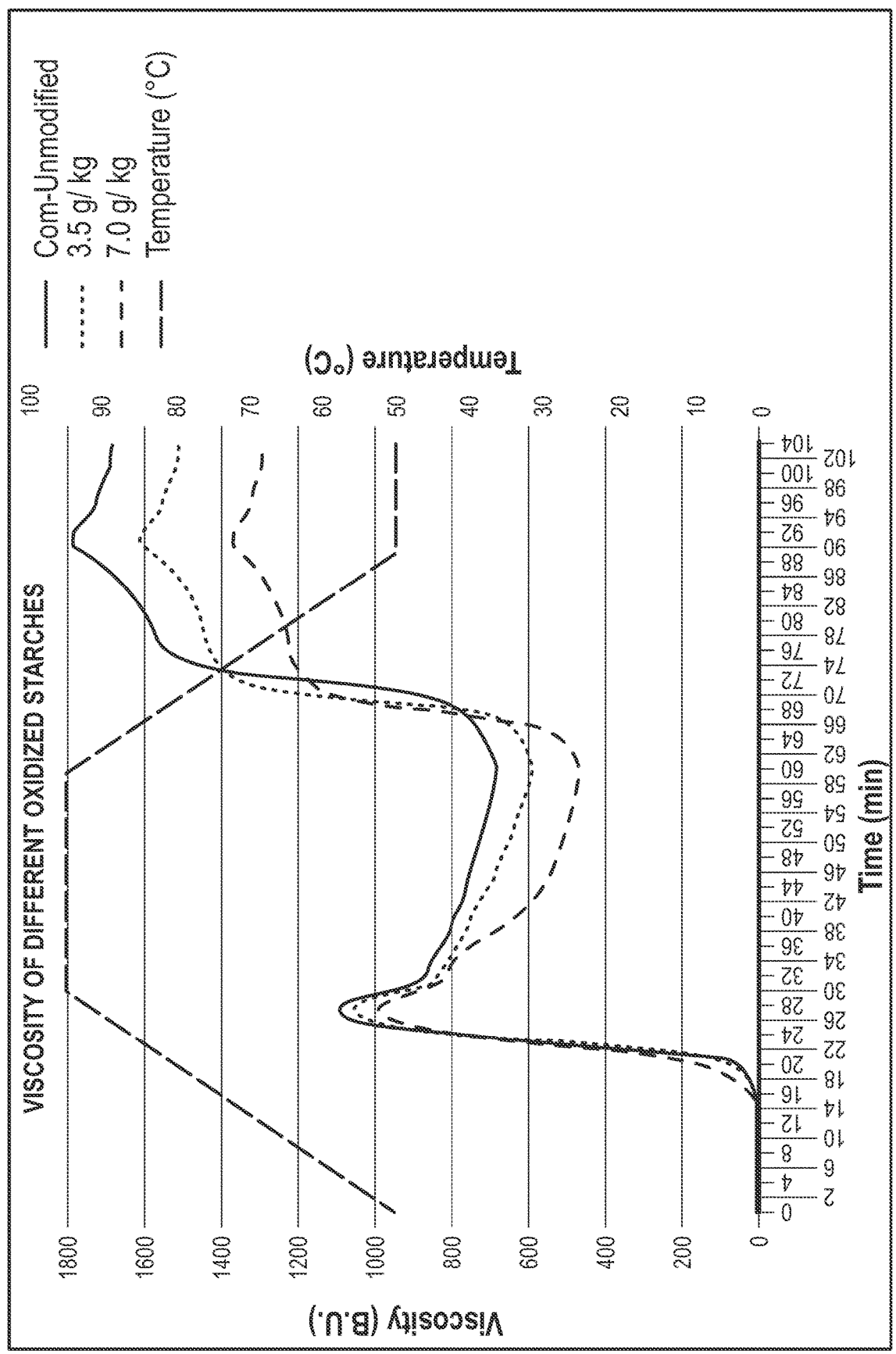
FIG. 5 illustrates the viscosity profiles of starch slurries as described in Inventive Example 7.

By analyzing the data in FIG. 5, it is possible to see the shift of the pasting on-set from roughly 21 minutes for the native starch to roundabout 18 minutes in the most oxidized sample, also noticeable is the decrease in the slurry viscosity with increasing chlorine concentration. The carboxyl group content was measured for a separate sample containing 2% (20 g/kg) active chlorine, the analysis yielded 0.13% of COOH groups in the molecular starch matrix, a value very similar to the one reported by Kuakpetoon, Daris, and Ya-Jane Wang. "Characterization of different starches oxidized by hypochlorite." Starch-Stärke 53.5 (2001): 211-218. (0.14% for 2% active chlorine via wet modification).

The invention claimed is:

1. A method of preparing a blend comprising a polysaccharide and an ingredient, the method comprising:
   a) feeding a polysaccharide slurry to a filter centrifuge via a first inlet;
   b) rotating the filter centrifuge at a first centrifuge speed of 300-1500 rpm to provide a polysaccharide cake;
   c) feeding a sprayable ingredient to the filter centrifuge via a second inlet; and
   d) spraying the sprayable ingredient onto the polysaccharide cake while rotating the filter centrifuge at a second centrifuge speed of 50-1000 rpm to produce a blend of the polysaccharide and the ingredient;
wherein:
the polysaccharide slurry that is fed to the filter centrifuge has a slurry solvent content of 40-90% by total weight of the slurry;
the polysaccharide cake at the start of spraying the sprayable ingredient has a solvent content above 45% and up to 60% by total weight of the polysaccharide cake; and
the sprayable ingredient is sprayed for over a period of 5 min to 60 min.

2. The method according to claim 1, wherein the polysaccharide is one or more selected from the group consisting of hydrocolloids, cellulose, cellulose derivatives, starch, starch derivatives, maltodextrin, dextrin manno-oligosaccharides, xylo-oligosaccharides, polydextrose, glycogen, citrus fibres, cocoa fibres, and glucans.

3. The method according to claim 1, wherein the ingredient is one or more selected from the group consisting of salts, such as sodium carbonate, potassium carbonate, ammonium carbonate, calcium carbonate, sodium persulphate, potassium persulphate, ammonium persulphate, sodium sulphate, potassium sulphate, ammonium sulphate, sodium citrate, potassium citrate, ammonium citrate, lime; and additives, such as biocides, pH buffers; pH adjusting chemicals, such as sodium hydroxide, potassium hydroxide, ammonium hydroxide, sodium bicarbonate, potassium bicarbonate, ammonium bicarbonate, hydrogen chloride, sulphuric acid; processing aids, antifoaming agents, flowing agents, and bleaching agents.

4. The method according to claim 1, wherein the polysaccharide slurry that is fed to the filter centrifuge has a slurry-solvent content of 50-80%.

5. The method according to claim 1, wherein the first centrifuge speed is 400-1200 rpm; and/or wherein the second centrifuge speed is 200-500 rpm.

6. The method according to claim 1, wherein sprayable ingredient is a sprayable mixture of the ingredient in an ingredient-solvent.

7. The method according to claim 6, wherein the concentration of the ingredient in the sprayable mixture is 0.1-400 g/l.

8. The method according to claim 1, wherein the sprayable ingredient is sprayed over the polysaccharide cake using a spray bar.

9. The method according to claim 1, wherein the amount of sprayable ingredient sprayed is 0.1-0.6 1 per kg of polysaccharide cake.

10. The method according to claim 1, wherein the sprayable ingredient is sprayed at a rate of 10-1000 ml/min/kg polysaccharide.

11. The method according to claim 1, wherein the sprayable ingredient is sprayed for over a period of 5 to 35 min.

12. The method according to claim 1, wherein the polysaccharide cake has a thickness of 0.5-10 cm.

13. The method according to claim 1 further comprising removing solvent from the polysaccharide cake before spraying the sprayable ingredient.

14. The method according to claim 1 further comprising drying the blend.

15. The method according to claim 14, wherein drying the blend comprises centrifuging and/or blowing of hot air.

16. A method of preparing a blend comprising a polysaccharide and an ingredient, the method comprising:
a) feeding a polysaccharide slurry to a filter centrifuge via a first inlet;
b) rotating the filter centrifuge at a first centrifuge speed to provide a polysaccharide cake;
c) feeding a sprayable ingredient to the filter centrifuge via a second inlet; and
d) spraying the sprayable ingredient onto the polysaccharide cake while rotating the filter centrifuge at a second centrifuge speed of at least 10 rpm to produce a blend of the polysaccharide and the ingredient, wherein the sprayable ingredient is sprayed over the polysaccharide cake using a spray bar over a period of 1-60 min;
wherein:
the polysaccharide slurry that is fed to the filter centrifuge has a slurry solvent content of 40-90% by total weight of the slurry;
the polysaccharide cake at the start of spraying the sprayable ingredient has a solvent content of above 45% and up to 60% by total weight of the polysaccharide cake; and
the sprayable ingredient is selected from the group consisting of sodium carbonate, potassium carbonate, ammonium carbonate, sodium persulphate, potassium persulphate, ammonium persulphate, calcium carbonate, sodium sulphate, potassium sulphate, ammonium sulphate, sodium citrate, potassium citrate, ammonium citrate, lime, sodium hydroxide, potassium hydroxide, ammonium hydroxide, sodium bicarbonate, potassium bicarbonate, ammonium bicarbonate, hydrogen chloride, sulphuric acid, sodium trimetaphosphate (STMP), phosphorylchloride ($POCl_3$), sodium hypochlorite (NaClO), hydrogen peroxide, adipic acid, acetic anhydride, p-octenyl succinic anhydride, 3-chloro-2-hydroxypropyl trimethylammonium chloride (CHPT), propylene oxide, and epichlorohydrine.

* * * * *